United States Patent [19]

Kosugi

[11] Patent Number: 5,257,820
[45] Date of Patent: Nov. 2, 1993

[54] SLIP ANCHOR FOR SEAT BELT
[75] Inventor: Noriyuki Kosugi, Kanzaki, Japan
[73] Assignee: Takata Corporation, Tokyo, Japan
[21] Appl. No.: 3,879
[22] Filed: Jan. 12, 1993

Related U.S. Application Data

[63] Continuation of Ser. No. 699,074, May 13, 1991, abandoned.

[30] Foreign Application Priority Data

May 16, 1990 [JP] Japan .................................... 127096

[51] Int. Cl.⁵ .................................................. B60R 22/18
[52] U.S. Cl. ...................................... 280/808; 297/483;
24/163 R; 242/107
[58] Field of Search ................ 280/801, 808; 297/483;
242/76, 107; 24/163 R, 713.6; 226/196, 197

[56] References Cited
U.S. PATENT DOCUMENTS

| | | | |
|---|---|---|---|
| 4,023,826 | 5/1977 | Kokubo | 24/163 R |
| 4,508,286 | 4/1985 | Seifert | 280/808 |
| 4,730,875 | 3/1988 | Yoshitsugu | 297/483 |
| 4,789,186 | 12/1988 | Andersson | 280/808 |
| 4,861,070 | 8/1989 | Boag | 280/808 |
| 4,871,192 | 10/1989 | Escaravage | 280/808 |

FOREIGN PATENT DOCUMENTS

| | | |
|---|---|---|
| 0216738 | 4/1987 | European Pat. Off. . |
| 0223582 | 5/1987 | European Pat. Off. . |
| 0240148 | 10/1987 | European Pat. Off. . |
| 2711401 | 9/1978 | Fed. Rep. of Germany ...... 297/483 |
| 3505928 | 8/1986 | Fed. Rep. of Germany ...... 280/808 |
| 3530495 | 3/1987 | Fed. Rep. of Germany ...... 297/483 |
| 1-94052 | 4/1989 | Japan .................................... 280/808 |
| 2189377A | 10/1987 | United Kingdom . |

Primary Examiner—Karin L. Tyson
Attorney, Agent, or Firm—Armstrong, Westerman, Hattori, McLeland & Naughton

[57] ABSTRACT

A slip anchor for a seat belt has a guide hole which slidably guides the webbing in a longitudinal direction. An escape portion is formed at least on one end of the guide hole, and a projection is provided on the connecting section between the escape portion and the guide hole. Accordingly, the webbing is guided by the projection, and this perfectly prevents the inversion of the webbing. Further, the escape portion can be formed relatively large, and the end of the escape portion to be contacted by a lateral portion of the webbing can be eliminated. As a result, this prevents tearing of the webbing and also prevents twisting of webbing due to inversion.

5 Claims, 3 Drawing Sheets

SLIP ANCHOR FOR SEAT BELT

This application is a continuation of application Ser. No. 07/699,074 filed May 13, 1991, now abandoned.

BACKGROUND OF THE INVENTION

The present invention relates to a slip anchor for a seat belt, which is movably supported on pillar or the like of a car body and slidably guides the webbing of seat belt in a longitudinal direction.

The seat belt unit to be provided on a seat of a vehicle such as an automobile restrains the occupant of the vehicle in an emergency such as vehicle collision and protects the occupant from injury due to crash against car body.

Such seat belt is furnished with a slip anchor, which is supported on a pillar or the like of a car body and slidably guides the webbing of seat belt in a longitudinal direction. By this slip anchor, it is possible to restrain the occupant by seat belt at correct position.

If webbing is twisted, webbing is not only not correctly adapted to the occupant, but smooth movement of the webbing is also hindered. Therefore, when webbing is guided by slip anchor, webbing must not be twisted.

In the past, a slip anchor with means for preventing the twisting of webbing has been known as, for example, the one disclosed in the Japanese Provisional Utility Model Publication No. 52-148622. As shown in FIG. 2(a), the slip anchor disclosed in this publication is provided with a main unit 1, comprising a mount 2 and a guide unit 3. The main unit 1 is movably mounted on car body by adequate fixing means such as bolt, which is inserted into a mounting hole 4 of the mount 2. The guide unit 3 is furnished with a guide hole 5, into which the webbing 6 of seat belt is passed. The gap "a" of the webbing 6 in the direction of its thickness formed by the guide hole 5 is set to such size that the webbing 6 is not pulled in twisted state.

According to the slip anchor for seat belt as described above, the webbing 6 is not guided in twisted state and it smoothly slides in the guide hole 5 at all times.

In such slip anchor, it is desirable that the webbing 6 naturally and smoothly slides in a lateral direction when it is pulled. For this reason, a slip anchor of conventional type is furnished with escape portions 5a on both ends of the guide hole 5. In this case, the escape portion 5a is formed in curve on the mount 2 so that the gap "b" is formed in the same size as the gap "a" of the guide hole 5. By this escape portion 5a, the webbing 6 can be smoothly displaced when it is pulled.

However, because the gap "b" of the escape portion 5a in this slip anchor is in the same size as the above gap "a", the lateral portion 6a of the webbing 6 is brought into touch with the end 5a' of the escape portion 5a when the webbing 6 is moved, and the surface of the lateral portion 6a of the webbing 6 may be damaged. To avoid the contact between the lateral portion 6a of the webbing 6 and the end 5a' of the escape portion 5a, it has been proposed to form the escape portion 5b wider as shown in FIG. 2(b). In such slip anchor, the escape portion 5b is big and there is no end, with which the lateral portion 6a of the webbing is brought into contact.

However, because the escape portion 5b is big in the slip anchor shown in FIG. 2(b), the webbing 6 may be twisted in some cases as shown in FIG. 3. Accordingly, it is not possible to form the escape portion 5b unconditionally.

SUMMARY OF THE INVENTION

The object of the present invention is to offer a slip anchor for a seat belt, in which the webbing is not twisted and the tearing of lateral portion of the webbing can be prevented.

To attain the above object, the slip anchor for seat belt according to the present invention is movably mounted on car body and is provided with a guide hole for slidably guiding the webbing of a seat belt in a longitudinal direction, and it is characterized in that at least one end of said guide holes is furnished with an escape portion, and a projection is formed on the connecting section between this escape portion and said guide hole.

In this case, the projection may be a protuberance formed on the main unit, and it is desirable that the gap of the connecting section is set to such size by this protuberance that it is smaller than two times of the thickness of the webbing and larger than the thickness of said webbing.

In the slip anchor for seat belt according to the present invention with such arrangement, the webbing is guided by the projection and the inversion of the webbing is perfectly prevented because a projection is furnished on the connecting section between the escape portion and the guide hole. Also, because the escape portion is formed relatively big, there is no end being contacted by the lateral portion of the webbing, and the tearing of the webbing can be prevented, and the twisting of the webbing can be avoided.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

In the following, the embodiments of the present invention will be described in connection with the drawings.

Figure 1A:
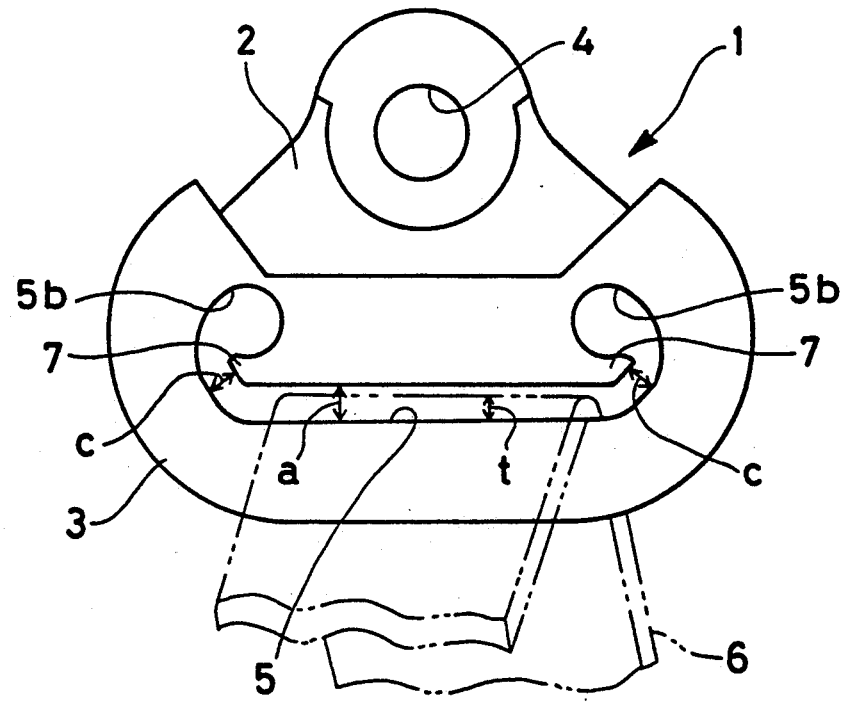
FIGS. 1(a) and 1(b) show the embodiments of slip anchor for a seat belt according to the present invention.

As shown in FIG. 1(a), the slip anchor in this embodiment is furnished with a guide hole 5, into which the webbing 6 is penetrating as in the conventional type product. The gap "a", is bigger than the thickness "t" of the webbing 6 but it is smaller than two times of the thickness "t" of the webbing 6. An escape portion 5b is provided on both ends of this guide hole 5, and the escape portions 5b are formed relatively large. Further, in the main unit 1, a pair of protuberances 7 are formed on the connecting section between the guide hole 5 and the escape portions 5b. The protuberances 7 extend in a direction other than the thickness of its webbing in its normal position. By this protuberance, the gap "c" of the connecting section between the guide hole 5 and the escape portions 5b is formed smaller than two times of the thickness "t" of the webbing 6 and bigger than the thickness "t" of the webbing.

Even when the escape portion 5b is formed big, the inversion and folding back of the webbing 6 entering the escape portion 5b can be prevented by the protuberance 7. Because the escape portion 5b is large, there is no part, which is brought into contact with lateral portion of the webbing, and this contributes to the prevention of tearing on lateral portions of the webbing.

In the above embodiment, the escape portions 5b and the protuberances 7 are furnished on both ends of the guide hole 5, whereas the escape portion 5b and protuberance 7 may be provided on either one of the ends.

Figure 1B:
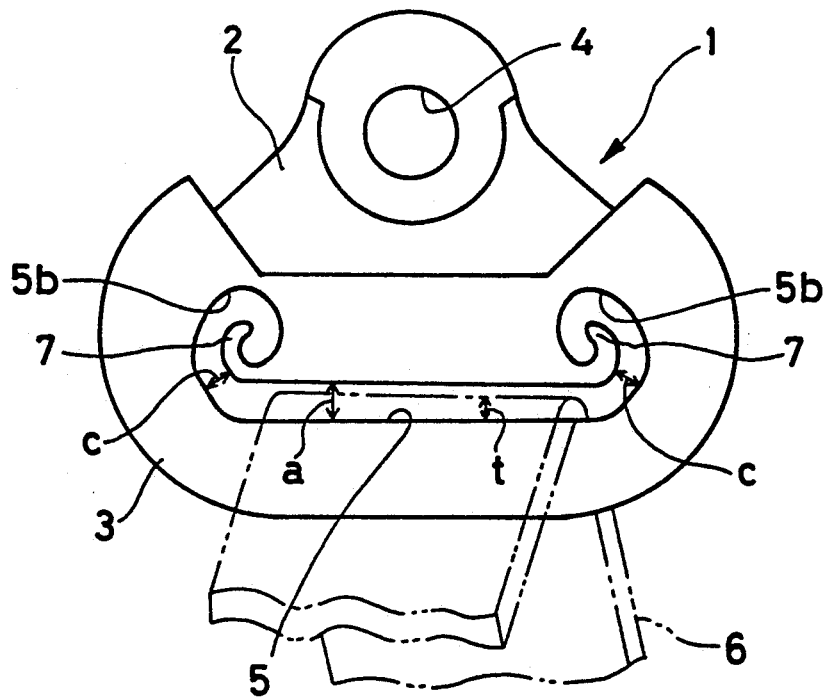
Figure 2A:
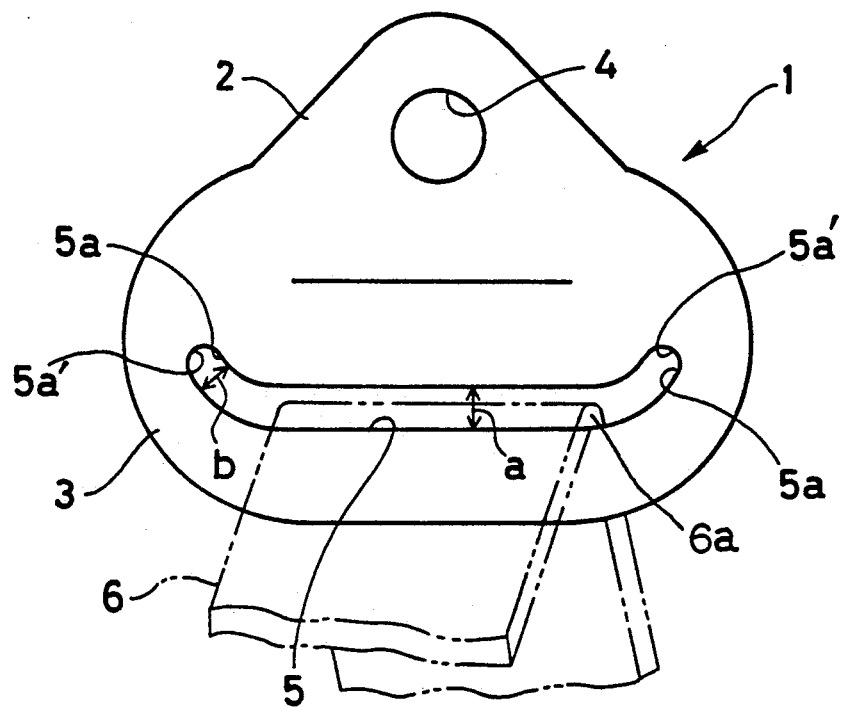
FIGS. 2(a) and 2(b) represent conventional type slip anchors for a seat belt.
Figure 2B:
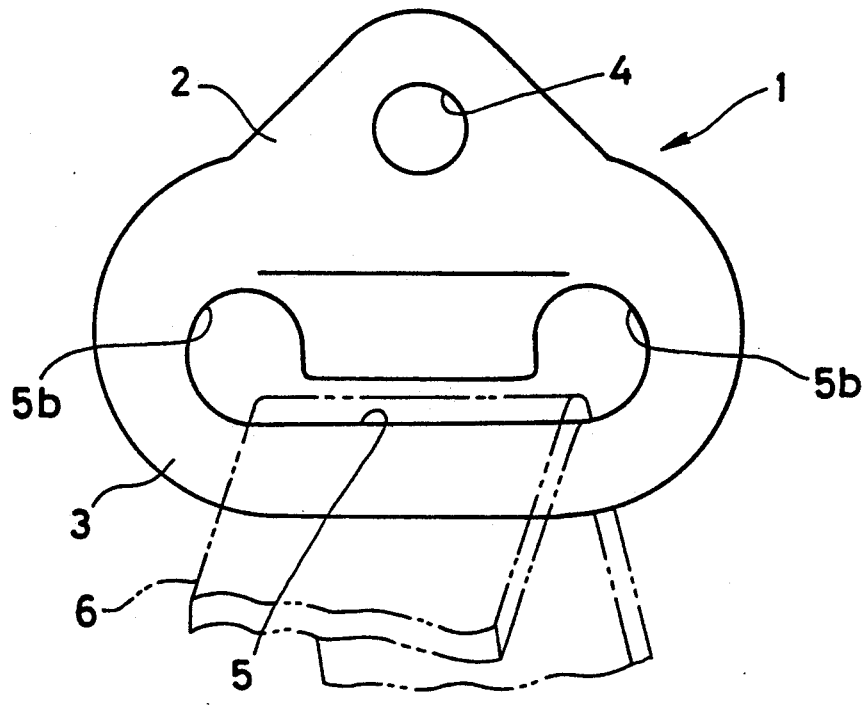
Figure 3:
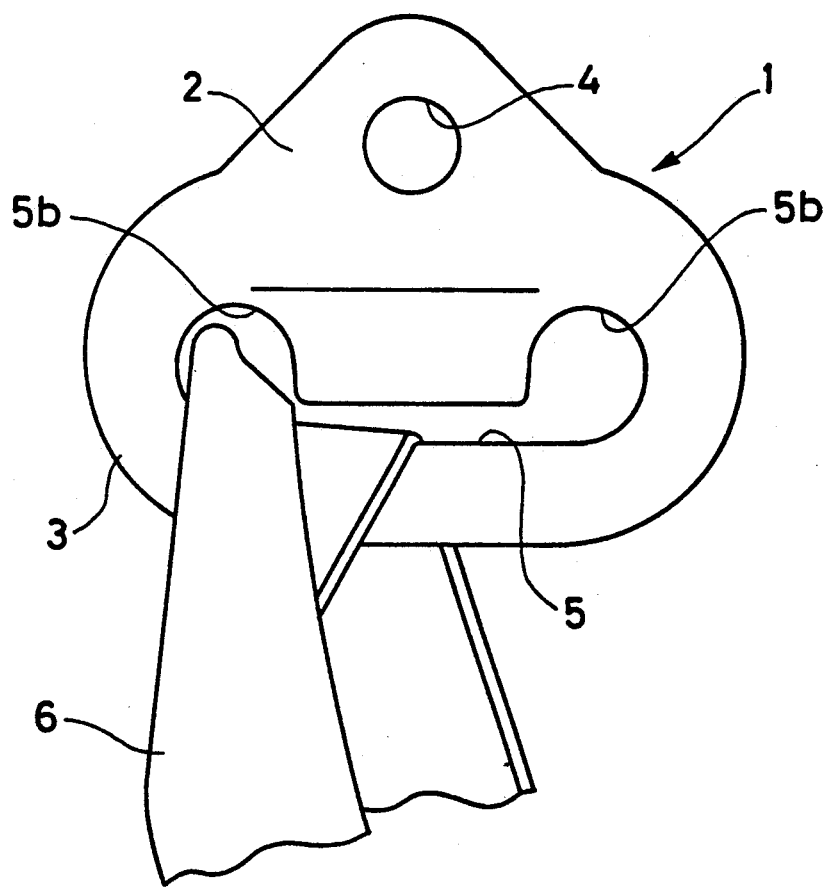
FIG. 3 is a drawing to show the behavior of the webbing of the seat belt relative to the conventional type of slip anchor for a seat belt.

FIG. 1(b) shows another embodiment of this invention. The same components as in the above embodiment are referred by the same symbols, and detailed description is not given here.

As shown in FIG. 1(b), the protuberance 7 is curved further upward in this embodiment. This makes it possible to create a spiral shaped curved gap at the end of the guide hole to elongate the gap "c" of the connecting section between the guide hole 5 and the escape portion 5b and to prevent more perfectly the inversion and folding back of the webbing 6, which enters the escape portion 5b.

As it is evident from the above description, it is possible by this invention to perfectly prevent the inversion of the webbing because protuberance is furnished on the connecting section between the escape portion and the guide hole and the webbing is guided correctly by the protuberance. As the result, the escape portion can be formed relatively large, and the portion to contact the lateral portion of the webbing can be eliminated. Further, the tearing of the lateral portion of the webbing can be prevented, and the twisting of the webbing by inversion can be perfectly eliminated.

What we claim is:

1. A slip anchor for a seat belt, said slip anchor adapted to be movably mounted on a car body, said slip anchor comprising:
   a guide unit having a guide hole for slidably guiding a seat belt in a longitudinal direction of the seat belt;
   said guide unit including a section which extends to define one side of said guide hole for accommodating said seat belt;
   said guide hold being elongated with a length thereof greater than a width thereof and having curved ends;
   an escape portion provided on at least one of said curved ends of said guide hole, said escape portion defined by an enlarged opening extending from said at least one end of said guide hole and becoming wider than said width of said guide hole; and
   a curved projection extending from said section of said guide unit into said escape portion for accommodating said seat belt and preventing twisting, tearing or snagging of the seat belt while sliding through the guide hole of the slip anchor.

2. A slip anchor for a seat belt according to claim 1, wherein said projection is a protuberance formed on said guide unit.

3. A slip anchor for a seat belt according to claim 2, wherein said guide hole is less than two times the thickness of said seat belt and larger than the thickness of said seat belt.

4. A slip anchor for a seat belt according to claim 2, wherein said protuberance extends substantially within said escape portion and is curved within said escape portion so as to define a spiral shaped curved gap at the end of said guide hole, said spiral shaped curved gap having a width substantially equal to the width of said guide hole.

5. A slip anchor for a seat belt, comprising:
   a guide unit movably mounted on a car body, said guide unit having a guide hole for slidably guiding a seat belt in a longitudinal direction;
   said guide hole being elongated with a length thereof greater than a width thereof;
   an escape portion provided on at least one end of said guide hole, said escape portion defined by an enlarged opening extending from said at least one end of said guide hole and becoming substantially wider than said width of said guide hole; and
   a projection extending from a section of said guide unit between said escape portion and said guide hole into said enlarged opening defining a curved gap extending from said guide hole for accommodating said seat belt and preventing twisting, tearing or snagging of the seat belt while sliding through the guide hole of the slip anchor.

* * * * *